June 11, 1963   M. WIZELMAN   3,092,945
BLISTER PACKAGING MACHINE
Filed Oct. 10, 1961   3 Sheets-Sheet 1
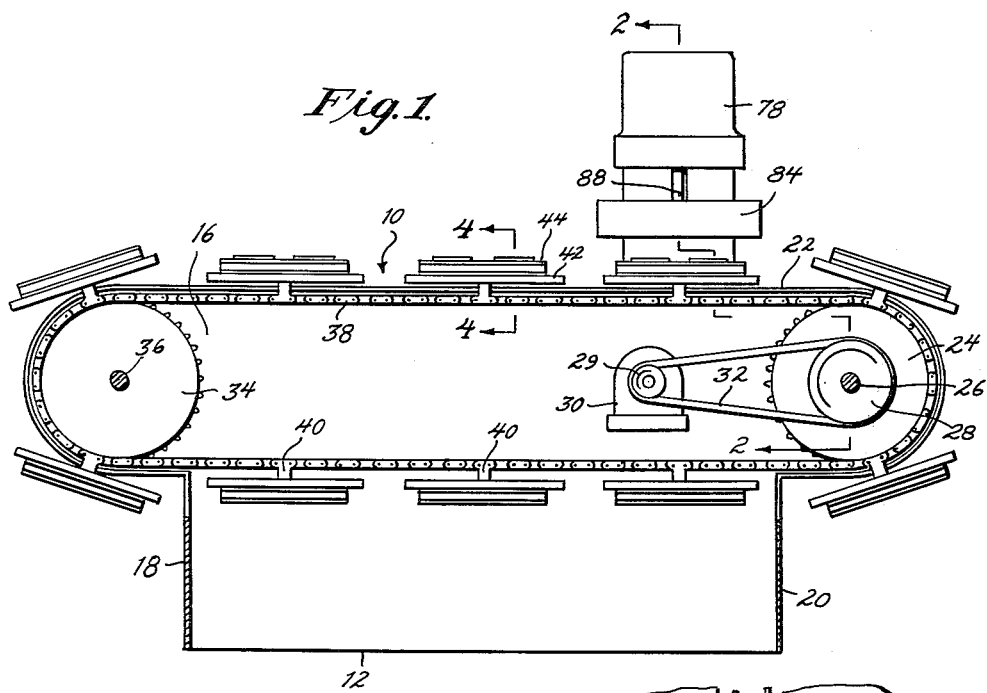
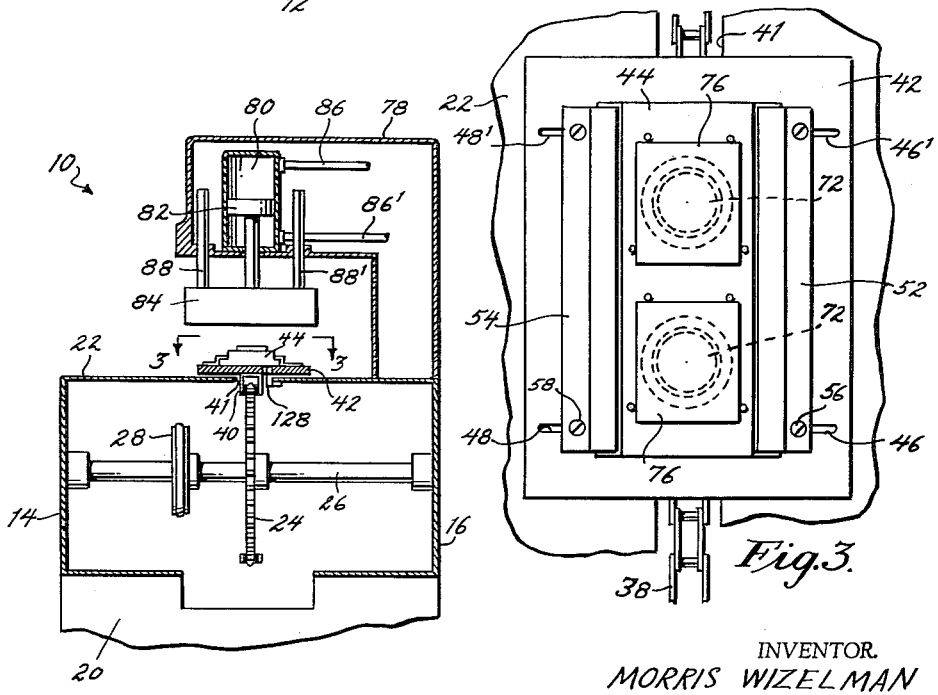
INVENTOR.
MORRIS WIZELMAN
BY
Arthur H. Seidel
ATTORNEY June 11, 1963 M. WIZELMAN 3,092,945
BLISTER PACKAGING MACHINE
Filed Oct. 10, 1961 3 Sheets-Sheet 2

INVENTOR.
MORRIS WIZELMAN
BY
Arthur H. Seidel
ATTORNEY.

INVENTOR.
MORRIS WIZELMAN

United States Patent Office 3,092,945
Patented June 11, 1963

3,092,945
BLISTER PACKAGING MACHINE
Morris Wizelman, Cheltenham, Pa., assignor to Globe Industries, Inc., Philadelphia, Pa., a corporation of Pennsylvania
Filed Oct. 10, 1961, Ser. No. 144,222
7 Claims. (Cl. 53—373)

This invention relates to a blister packaging machine, and more particularly to an automatic in-line feeding blister packaging machine for heat sealing cellulose acetate blisters to a display card with an article disposed within said blister.

Hertofore, it has been conventional in the art to provide a blister packaging machine with a circular conveyor means for feeding article-containing blisters to a heat sealing press. Such circular conveyor type blister packaging machines have not been entirely satisfactory. One disadvantage of such circular type blister packaging machines lies in the fact that an operator is required to remove the package article from the die after the blister has been heat sealed to the article-carrying card. In accordance with the present invention, the packaged articles are automatically discharged from the die mold.

The present invention provides a blister packaging machine having an in-line conveyor system. Such an in-line conveyor system provides for numerous advantages not obtainable with a circular type blister packaging machine. Thus, the in-line conveyor system is readily adaptable to being extended by providing removable center sections so as to increase the length of the conveyor belt. In addition, the in-line conveyor system provides for automatic discharge of the packaged articles and is readily adaptable to the provision of a skip-station feature in accordance with the present invention.

The present invention includes a blister packaging machine having a skip-station feature. That is, the blister packaging machine of the present invention is provided with a heat sealing platen which only reciprocates to a heat sealing position in response to the presence of a die plate disposed therebelow. Also, the blister packaging machine of the present invention includes circuitry capable of deactivating the heat sealing platen so that the apparatus may be utilized solely as a conveyor device.

It is an object of the present invention to provide a novel blister packaging machine.

It is another object of the present invention to provide a novel blister packaging machine having an in-line conveyor system.

It is another object of the present invention to provide a novel blister packaging machine having an in-line conveyor system with readily removable die plates.

It is another object of the present invention to provide a novel blister packaging machine having an intermittently operated conveyor system with a heat sealing platen reciprocating to a heat sealing position only in response to the presence of a die plate therebelow.

It is still a further object of the present invention to provide a novel blister packaging machine capable of being converted into a conveyor device.

It is still another object of the present invention to provide a novel blister packaging machine so that packaged articles are dispensed automatically from the machine.

It is still another object of the present invention to provide a novel machine capable of heat sealing cellulose acetate blisters to a display card with an article disposed within said blister.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevational view of the blister packaging machine of the present invention with a portion of the housing shown in section.

FIGURE 2 is a transverse sectional view taken along the lines 2—2 in FIGURE 1.

FIGURE 3 is a top plan view of the die mounting structure taken along the lines 3—3 of FIGURE 2.

Figure 4:
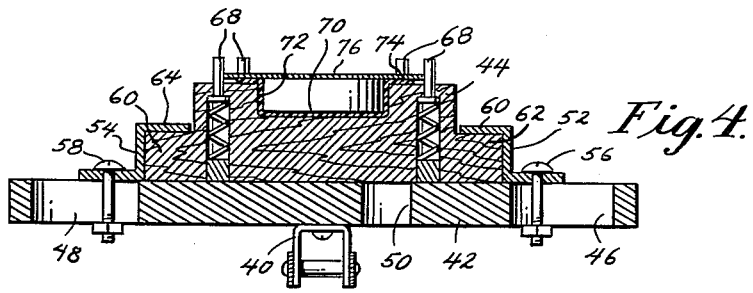
FIGURE 4 is a transverse sectional view taken along lines 4—4 in FIGURE 1.

Referring to the drawings in detail, wherein like numerals indicate like elements, and there is shown in FIGURE 1 a blister packaging machine designated generally as 10. The blister packaging machine 10 includes a housing 12 having side walls 14 and 16 interconnected with front wall 18 and rear wall 20. The housing 12 is provided with a top wall 22 extending between the side walls 14 and 16.

A sprocket 24 is disposed within the housing 12 and fixedly secured to an axle 26 rotatably mounted within bearings affixed to the side walls 14 and 16 as shown more clearly in FIGURE 2. A pulley 28 is fixedly secured to the axle 26 spaced along the length of the axle 26 from the sprocket 24. An endless belt 32 extends around the pulley 28 and a pulley 29 on an intermittently operated motor 30. Thus, it will be seen that the intermittently operated motor 30 causes intermittent rotation of the sprocket 24.

The sprocket 24 is supported within a curved portion of the housing 12 extending between the rear wall 20 and the top wall 22. In a similar portion of the housing 12 at the other end thereof, a sprocket 34 is rotatably supported by means of an axle 36. An endless chain 38 extends around the sprockets 24 and 34 and is meshingly engaged with the teeth on said sprockets.

Mounting arms 40 are fixedly secured to the chain 38 at spaced points therealong. Ten such arms are illustrated in FIGURE 1. It will be obvious to those skilled in the art that a greater or lesser number of such mounting arms may be provided. Each mounting arm 40 extends through an elongated slot 41 in the top wall 22 of the housing 12.

The lower surface of a substantially planar mounting plate 42 is fixedly secured to each one of the mounting arms 40. Means are provided for removably securing a die plate 44 in an adjustable manner to each one of the mounting plates 42.

Figure 5:
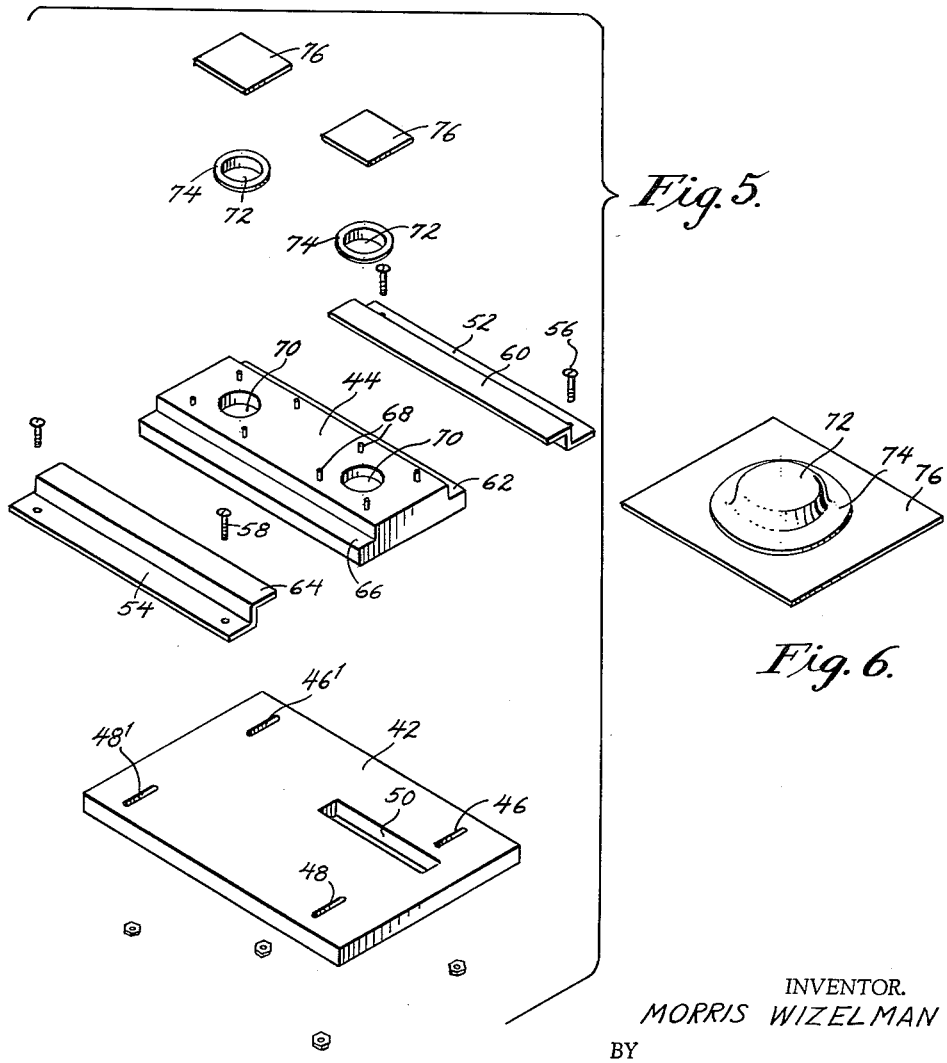
FIGURE 5 is an exploded view of the die plate and mounting plate shown in FIGURE 4.
Figure 6:
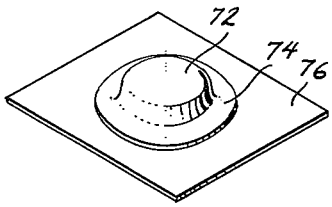
FIGURE 6 is a perspective view of a display card having a blister heat sealed thereto.

As shown more clearly in FIGURE 5, the mounting plate 42 is provided with a pair of elongated slots 46 and 46' along one side thereof. A pair of elongated slots 48 and 48' are provided along the other side of the mounting plate 42 juxtaposed to the slots 46 and 46', respectively. The mounting plate 42 is provided with an elongated slot 50 for a purpose to be described hereinafter.

The die plate 44 is preferably made from wood and is removably secured to the mounting plate 42 by means of Z-shaped brackets 52 and 54. The brackets 52 and 54 are adjustably secured to the mounting plate 42 by means of bolts 56 and 58, respectively. The bolts 56 and 58 extend through the elongated slots 46 and 48 respectively, as illustrated in FIGURE 4.

The bracket 52 is provided with an arm 60 which overlies a shoulder 62 on the die plate 44. The bracket 54 is provided with an arm 64 which overlies a shoulder 66 on the die plate 44. Accordingly, the die plate 44 is capable of being readily separated from the mounting plate 42 merely by loosening the bolts 56 and 58 and sliding the brackets 52 and 54 in a direction away from the die plate 44.

The die plate 44 is provided with a plurality of blind holes extending from the surface adapted to be juxtaposed to the mounting plate 42. A plurality of pins 68 extend through an aperture from said blind holes above the upper surface of the die plate 44. Each of the pins 68 are spring biased for a purpose to be described hereinafter. Each die plate 44 is provided with at least one die 70. As shown in FIGURE 5, two such dies are illustrated in the die plate 44.

The dies 70 are adapted to receive a cup-shaped blister 72 having a flange 74 extending therefrom. The flange 74 is received on the upper surface of the die plate 44. A mounting card 76 is juxtaposed to the flange 74. The blister 72 is preferably made from a cellulose acetate or clear polyvinyl plastic. The card 76 is preferably a stiff paper coated with pyroxylin.

As shown more clearly in FIGURE 2, the housing 12 is provided with an extension 78 disposed above the top wall 22. The housing extension 78 is provided with an air cylinder 80 therein. A piston 82 is reciprocally mounted within the cylinder 80 and has a piston rod interconnecting the same with a reciprocably mounted platen 84.

Conduits 86 and 86' are provided in communication with opposite ends of the cylinder 80 for supplying motive fluid to the cylinder 80 for actuating the piston 82. The platen 80 is provided with guide rods 88 and 88' extending upwardly therefrom through guide bearings in the housing extension 78. As will be made clear hereinafter, the platen 84 is provided with a heating element and is designed to heat seal the flange 74 on the blister 72 to the card 76.

Figure 7:
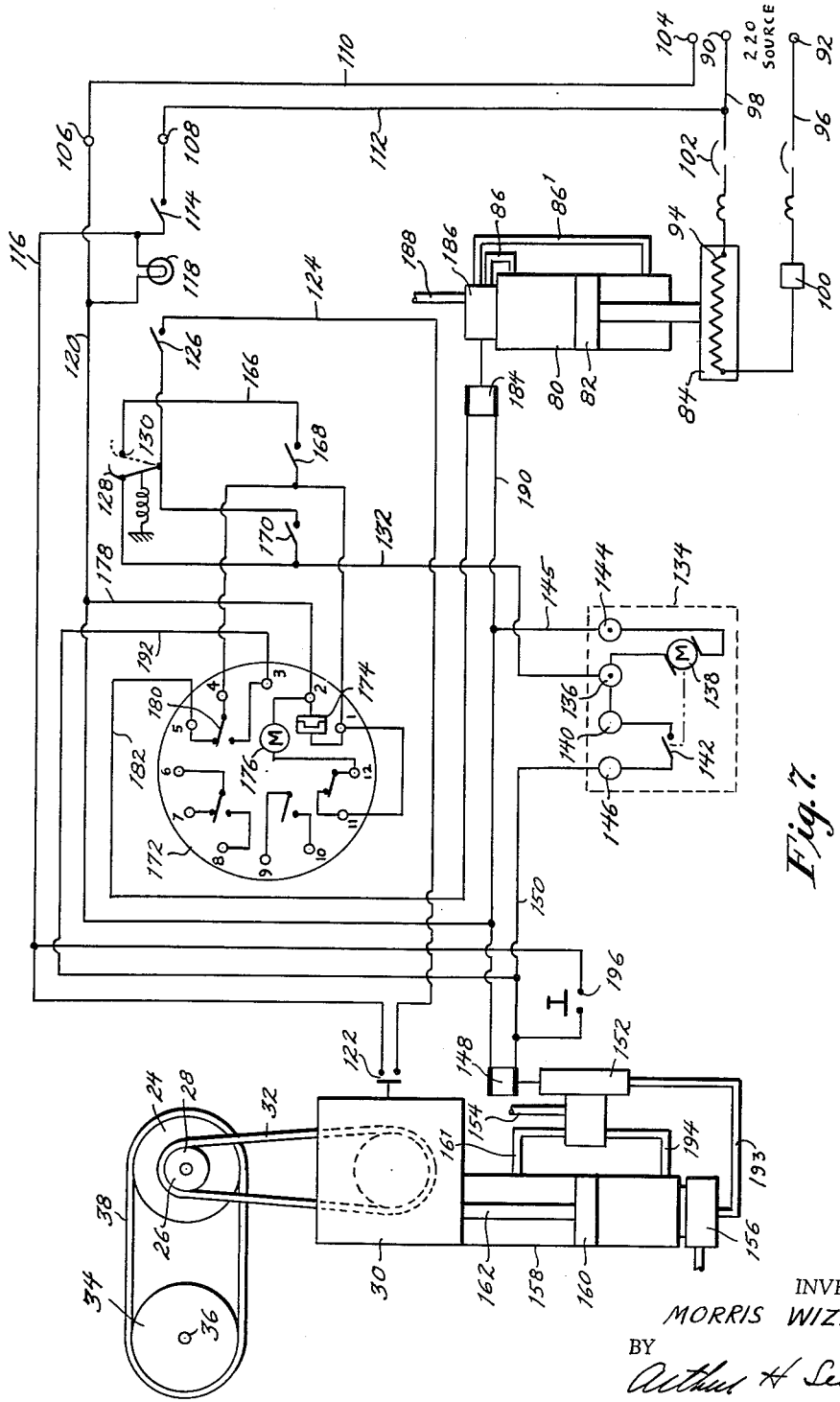
FIGURE 7 is a schematic illustration of the wiring diagram and its relationship to certain elements of the machine of the present invention.

As shown more clearly in FIGURE 7, the platen 84 is provided with a heater coil 94 therein. The heater coil 94 is connected to the terminals 90 and 92 of a 220-volt source by wires 96 and 98. Wire 96 is provided with a thermostatic switch 100 and a circuit breaker 102 is provided across the lines 96 and 98.

The 220-volt source is provided with a neutral terminal 104. A terminal 106 is connected to the neutral terminal 104 by a wire 110. A terminal 108 is connected to the wire 98 by wire 112. Since the wire 110 is connected to a neutral terminal, and the wire 112 is connected to one terminal of a 220-volt source, 110 volts will be impressed across the terminals 106 and 108.

A wire 116 connected to the terminal 108 is provided with a main power switch 114. An indicator light 118 extends between the wire 116 and the wire 120 which is connected to the terminal 106. Accordingly, the light 118 is lit when the main power switch 114 is closed.

As soon as the main power switch 114 is closed, the power in wire 116 is supplied to a normally closed switch 122. From the switch 122, power is supplied by the wire 124 to the stop cycle switch 126.

From the stop cycle switch 126, the power is supplied through the arm 128 of the skip station switch 130 through wire 132 to input terminals 136 and 140 of the skip station timer 134. The input terminal 136 is connected to the timer motor 138. The input terminal 140 is connected to one side of the power drive impulse switch 142. The output terminal 144 of the motor 138 is connected to the terminal 106 by means of wires 145 and 120.

The output terminal 146 of the switch 142 is connected to a solenoid 148 by wire 150. The solenoid 148 is operatively associated with a four-way valve 152 which is controlled thereby.

The four-way valve 152 controls the distribution of motive fluid supplied by the supply conduit 154. In one position of a reciprocal spool within the valve 152, fluid is supplied from conduit 154 through conduit 161 into cylinder 158 above a reciprocally mounted piston 160. In another position of the spool of the valve 152, fluid is supplied to a two-way valve 156.

The piston 160 is connected to a piston rod 162. The end of the piston rod 162 remote from the piston 160 is provided with a rack which carries a pawl which in turn intermittently operates an index plate of the motor 30. The motor 30, cylinder 158, piston 160 and piston rod 162 are an integral unit commercially available from the A. K. Allen Co., Brooklyn, New York.

The switch element 128 is spring biased to the solid line position shown in FIGURE 7. In the absence of a die plate 44 on the mounting plate 42, the switch element 128 will project through the slot 50 so that the elements set forth above are activated. If a die plate 44 is mounted on the mounting plate 42 as the same are positioned above the switch arm 128 and below the platen 84 as shown in FIGURE 2, the switch arm 128 is biased to the phantom position shown in FIGURE 7.

When the switch arm 128 is biased to the phantom position shown in FIGURE 7, power is supplied through wire 166 and switch 168 to connecting terminals 1, 4 and 11 of the timer 172.

Terminals 1 and 2 of the timer 172 are interconnected with a clutch 174 for the timer motor 176. Terminal 2 of the timer 172 is connected to the terminal 106 by wires 178 and 120. The motor 176 is connected to the terminal 11 by means of terminal 12 and a normally closed switch. Since terminals 4 and 5 of the timer 172 are connected by a normally closed switch 180, power is supplied from terminal 5 through wire 182 to a solenoid 184. The solenoid 184 controls a movable valving element within the four-way valve 186.

The four-way valve 186 controls the supply and exhaust of motive fluid from the conduit 188 through the conduits 86 and 86' to the cylinder 80. The solenoid 184 is connected to the terminal 106 by wires 190 and 120.

After a predetermined period of time, the motor 176 of the timer 172 actuates the movable element of switch 180 so that terminals 3 and 4 are bridged thereby. At this point, power is supplied through wire 192 to solenoid 148 to reverse the cycle of the piston 160 by supplying motive fluid from conduit 154 through conduit 194 to the cylinder 158 below the piston 160.

A manual indexing switch 196 is provided so that closing of the same sends an impulse to the solenoid 148 so that single station movement of the die plate 44 may be provided.

The operation of the blister packaging machine 10 of the present invention is as follows:

It will be assumed that the heater coil 94 is connected to the source of power. When the switch 114 is closed, light 118 is lit and power is supplied through switches 122 and 130 to the skip station timer 134. After a predetermined period of time, the motor 138 closes the contacts of switch 142 so as to feed an impulse to the solenoid 148. Activation of the solenoid 148 permits pressurized air flowing through conduit 161 to move the piston 160 downwardly which in turn immediately opens switch 122. The opening of switch 122 isolates the skip station timer 134 from the source of power and the motor 30 moves the sprocket 24 a predetermined number of degrees so as to move a new die plate 44 below the platen 84.

It is to be noted that the platen 84 was not activated so as to move downwardly toward the mounting plate therebelow since the element 128 of the switch 130 was extending through the slot 50. The above operation will continue with intermittent operation of the sprockets 24 and 34 causing intermittent movement of the mounting plate 42 until a die plate 44 is positioned below the platen 84.

The presence of a die plate 44 below the platen 84 causes the element 128 to move to the phantom position shown in FIGURE 7. It will be assumed that the die plate 44 which has just been positioned below the platen 84 is provided with a blister 72 having an article to be packaged disposed therein with a card 76 juxtaposed to the flange 74 on the blister 72 as shown in FIGURE 4.

Movement of the element 128 to the phantom position shown in FIGURE 7 activates the motor 176 of the timer 172. Since the terminals 4 and 5 are normally bridged by the movable element of the switch 180, power is supplied to the solenoid 184. A solenoid 184 positions the movable element within the valve 186 so that motive fluid from the conduit 188 flowing through conduit 86 moves the piston 82 and platen 84 downwardly toward a die plate 44 disposed therebelow. The platen 84 biases the guide pins 68 for the card 76 against their spring bias until the platen 84 contacts the rear surface of the card 76. The heat and pressure of the platen 84 seals the flange 74 of the blister 72 to the coated surface on the card 76.

The pressurized motive fluid entering cylinder 158 moves the piston 160 toward the valve 156 until piston 160 abuts a spring biased plunger, not shown. This plunger actuates the valve 156 thereby placing conduit 193 in communication with atmosphere. Atmospheric pressure in conduit 193 causes reciprocation of the pressure balanced spool element in valve 152 thereby placing conduit 154 in communication with cylinder 158 through conduit 194 and interrupting flow through conduit 161. The presence of pressurized motive fluid such as air below piston 160 causes the same to move upwardly to a forward lock position thereby closing switch 122.

After a predetermined period of time, the movable element bridging terminals 4 and 5 of the timer 172 bridges the terminals 3 and 4. This results in a deactivation of the solenoid 184 to a position whereby motive fluid from conduit 188 flows through conduit 86' thereby moving the piston 82 and platen 84 upwardly. Simultaneously, the bridging of terminals 3 and 4 sends an impulse to the solenoid 148. The impulsing of solenoid 148 moves the element within the valve 152 so that motive fluid from conduit 154 flowing through conduit 161 initiates a new cycle. Movement of the piston 160 and piston rod 162 downwardly causes the intermittently operated motor 30 to index the sprockets 24 and 34 so as to reposition a new mounting plate 42 below the platen 84. If the new mounting plate 42 does not have a die plate 44 affixed thereto, the platen 84 will not be reciprocated downwardly as set forth above. If the new mounting plate 42 includes a die plate 44, the above cycle for actuation of the platen 84 will be effected.

It will be noted that the machine 10 of the present invention can be utilized only as an intermittently operated conveyor if desired. This is accomplished by opening normally closed switch 168 and closing normally open switch 170. Thereafter, the timer 172 and solenoid 184 are isolated from the source of power so that the solenoid 148 is intermittently activated so as to intermittently rotate the sprockets 24 and 34. The ability of the machine 10 of the present invention to be utilized solely as a conveyor device adds to the versatility of the present invention.

It will be noted that the provision of mounting plates and die plates on an endless chain causes the mounting plate to have an inverted position as shown at the right-hand end of the machine as illustrated in FIGURE 1. As the die plates assume an inverted position, the packaged article comprising a card 76 having a blister 72 heat sealed thereto separates from the die plate 44 due to gravity. If desired, a conveyor device may be disposed so as to receive the packaged articles. Alternatively, a container or the like may be provided so that the packaged articles fall into the same automatically. Thus, the machine of the present invention eliminates the necessity for providing an operator to remove the packaged article from the die plate as was conventional with the machines proposed heretofore. While the intermittently operated motor 30, its actuator, and the skip station timer 134, and the timer 172 are commercially available items, it will be appreciated by those skilled in the art that other equivalent devices may be substituted therefor. The timer 172 is preferably an encased unit capable of being completely removed so that a new unit may be substituted therefor if the first unit is defective for any reason. The housing 12 is preferably constructed of two halves mating along a center line so that the halves may be separated enabling an extension to be interposed therebetween so as to selectively increase the length of the machine 10. If the length of the machine 10 is increased, it will be appreciated that the length of the chain 38 will also have to be increased.

It will be observed that the mounting means for the die plate 44 permits facile removal of die plates 44 so that a new die plate having a different die may be substituted therefor. Also, the adjustability of the brackets 52 and 54 permits various size die plates to be mounted on the mounting plate 42. This last mentioned feature enables a die plate having a plurality of dies, for example four dies, to be utilized thereby materially increasing the rate of production of the machine. A complete cycle for movement of the platen 84 toward and away from a die plate 44 takes approximately four seconds. Thus, if each die plate 44 is provided with four dies, sixty articles will be packaged every minute.

The present invention may be embodied in other specific forms without departing from the spirit or essential attributes thereof and, accordingly, reference should be made to the appended claims, rather than to the foregoing specification as indicating the scope of the invention.

I claim:

1. An automatic blister packaging machine comprising a reciprocably mounted platen, an endless chain operatively disposed around a pair of spaced rotatably mounted sprockets, a motor means for intermittently rotating one of said sprockets, mounting plates fixed to said chain at spaced points therealong, a die plate removably secured to some of said mounting plates, said chain being operatively disposed with respect to said platen so as to intermittently position a mounting plate and die plate below said platen for a predetermined period of time, electromechanical means for moving said platen toward and away from a die plate juxtaposed thereto, and switch means responsive to a mounting plate which lacks a die plate secured thereto for preventing the reciprocation of said platen toward said last-mentioned die plate, said switch means including a switch element mounted so that it may extend through an aperture in a mounting plate to detect the absence of a die plate.

2. A blister packaging machine for heat-sealing a card to a synthetic resin blister having an article therein comprising a reciprocably mounted platen, means connected to said platen for heating the same, an endless chain means operatively disposed with respect to a pair of rotatably mounted sprocket means, mounting plates fixedly secured to said chain means at spaced points therealong, a die plate removably secured to each mounting plate, a motor means operatively connected to one of said sprocket means for intermittently rotating the same whereby each of said die plates are sequentially positioned opposite said platen for a predetermined period of time, means for moving said platen toward and away from said die plates opposite thereto, die means on each die plate for positioning said blister on said die plate, additional means on said die plate for positioning said card over said blister, and the securement of said mounting plates to said chain means enabling articles within a die on said die plates to be removed therefrom by gravity.

3. A blister packaging machine comprising a heated reciprocally mounted platen, means for intermittently positioning each one of a plurality of die plates juxtaposed to said platen for a predetermined period of time, each die plate being removably and adjustably secured to a mounting plate, electromechanical means for moving said platen toward and away from a die plate juxtaposed thereto within said predetermined period of time, and said positioning means enabling articles within a die on said die plates to be removed therefrom by gravity, each die plate being provided with a plurality of spring biased pins which project from the surface of each die plate which is adapted to be juxtaposed to said platen, said pins being guides for an article to be heat sealed by said platen, and said pins being depressed against the bias of their springs by engagement with said platen when said platen has moved for a predetermined distance toward one of said die plates.

4. An automatic apparatus comprising a reciprocally mounted heated platen, an endless conveyor means, an intermittently operated motor operatively connected to said endless conveyor means, a plurality of spaced die plates on said conveyor means, said conveyor means being adapted to selectively and intermittently position each die plate below said platen, means for moving said platen toward and away from said die plate disposed therebelow, said last-mentioned means including a switch having a movable element disposed in the path of movement of said die plates so that actuation of said platen is avoided in the absence of a die plate below said platen, each die plate being supported on a mounting plate coupled to said endless conveyor means, each mounting plate having a slot through which said switch element extends in the absence of a die plate on one of said mounting plates.

5. A blister packaging machine comprising a reciprocally mounted heated platen, an endless conveyor means, a plurality of spaced die plates supported by said conveyor means, said conveyor means being adapted to sequentially position each die plate below said platen, circuitry for intermittently operating said conveyor means and said platen, said circuitry including a first timer controlling operation of said conveyor means and platen, a skip station timer for operating said conveyor means, each timer being adapted to be coupled to a source of power, and a switch means responsive to the disposition of a die plate below said platen to isolate said skip station timer from a source of power, and said switch means isolating said first timer from a source of power in the absence of a die plate below said platen.

6. A machine in accordance with claim 5 including a mounting plate for each die plate, each mounting plate being secured to said endless conveyor, each die plate being removably secured to one of said mounting plates, and said switch means including a switch element adapted to extend through the mounting plates to detect the absence of a die plate thereon.

7. A machine in accordance with claim 5 wherein said circuitry includes a manually operable switch for isolating said first timer from a source of power regardless of the absence or presence of a die plate below said platen, whereby said conveyor means may continue to be intermittently operated in response to control by said skip station timer.

References Cited in the file of this patent

UNITED STATES PATENTS

| | | |
|---|---|---|
| 2,751,965 | Miller | June 26, 1956 |
| 2,888,787 | Cloud | June 2, 1959 |
| 2,896,387 | Brock | July 28, 1959 |
| 2,918,767 | Grinstead | Dec. 29, 1959 |
| 2,928,222 | Lindstaedt | Mar. 15, 1960 |
| 2,970,414 | Rohdin | Feb. 7, 1961 |
| 3,019,582 | Freeman | Feb. 6, 1962 |
| 3,048,954 | Abel | Aug. 14, 1962 |